(12) United States Patent
Tsuchihashi

(10) Patent No.: US 9,238,989 B2
(45) Date of Patent: Jan. 19, 2016

(54) EXHAUST APPARATUS OF CONSTRUCTION MACHINE

(71) Applicant: KOBELCO CONSTRUCTION MACHINERY CO., LTD., Hiroshima-shi (JP)

(72) Inventor: Tomoyuki Tsuchihashi, Hiroshima (JP)

(73) Assignee: KOBELCO CONSTRUCTION MACHINERY CO., LTD., Hiroshima-shi (JP)

( * ) Notice: Subject to any disclaimer, the term of this patent is extended or adjusted under 35 U.S.C. 154(b) by 47 days.

(21) Appl. No.: 14/230,215

(22) Filed: Mar. 31, 2014

(65) Prior Publication Data

US 2014/0311148 A1  Oct. 23, 2014

(30) Foreign Application Priority Data

Apr. 19, 2013 (JP) ................................. 2013-088524

(51) Int. Cl.
  *F01N 13/18* (2010.01)
  *F01N 13/00* (2010.01)
  (Continued)

(52) U.S. Cl.
  CPC .............. *F01N 13/002* (2013.01); *B60K 13/04* (2013.01); *E02F 9/0866* (2013.01); *F01N 3/05* (2013.01);
  (Continued)

(58) Field of Classification Search
  CPC ..... F01N 13/08; F01N 13/082; F01N 13/002; F01N 3/05; F01N 2270/00; F01N 2270/02; F01N 2270/06; F01N 2270/08; F01N 2270/10; F01N 2470/02; F01N 2470/24; F01N 1/14; F01N 13/1811; F01N 13/1816; B60K 13/04; E02F 9/0866

USPC ........... 60/274, 289, 298, 304, 307, 315–318, 60/320, 322, 324, 685, 686, 687, 689, 694, 60/695; 440/89 R, 89 A; 180/89.2, 309, 180/296
See application file for complete search history.

(56) References Cited

U.S. PATENT DOCUMENTS 4,792,014 A    12/1988  Shin-Seng
6,502,392 B1    1/2003  Paas
(Continued)

FOREIGN PATENT DOCUMENTS

DE          3221378 A1 * 12/1983 ............. B60K 13/04
JP          56-143112 U    10/1981
(Continued)

OTHER PUBLICATIONS

Extended European Search Report issued Jul. 3, 2014, in Patent Application No. 14162206.8.
(Continued)

*Primary Examiner* — Thomas Denion
*Assistant Examiner* — Mickey France
(74) *Attorney, Agent, or Firm* — Oblon, McClelland, Maier & Neustadt, L.L.P

(57) ABSTRACT

Provided is an exhaust apparatus provided in a construction machine with an engine and an engine room, the exhaust apparatus capable of suppressing vibration of an exhaust gas pipe and securing required strength thereof. The exhaust apparatus includes a duct provided in the engine room, a fan to suck air into the engine room and discharge through the duct the air to an outside as exhaust wind, and an exhaust gas pipe guiding exhaust gas of the engine into the duct. The exhaust gas pipe includes a duct inner portion inside the duct and a duct outer portion connected to the duct inner portion outside the duct. The duct inner portion has a plurality of discharge holes to allow the exhaust gas to be injected into the duct therethrough and discharged to the outside together with the exhaust wind. The duct inner portion is connected to the duct.

9 Claims, 3 Drawing Sheets

(51) Int. Cl.
- *F01N 3/05* (2006.01)
- *F01N 13/08* (2010.01)
- *B60K 13/04* (2006.01)
- *E02F 9/08* (2006.01)

(52) U.S. Cl.
CPC .......... *F01N 13/082* (2013.01); *F01N 13/1811* (2013.01); *F01N 2470/02* (2013.01); *F01N 2590/08* (2013.01); *Y02T 10/20* (2013.01)

(56) References Cited

U.S. PATENT DOCUMENTS

| | | | | |
|---|---|---|---|---|
| 9,027,676 B2 * | 5/2015 | Nakashima | ........... | E02F 9/0866 123/41.56 |
| 2004/0088968 A1 * | 5/2004 | Koelm | .................... | B08B 15/02 60/282 |
| 2006/0191254 A1 * | 8/2006 | Bui | ......................... | F01N 3/101 60/286 |
| 2007/0295002 A1 * | 12/2007 | Sakurai | .................... | F01N 1/006 60/299 |
| 2010/0186395 A1 * | 7/2010 | Yang | ......................... | F01N 1/14 60/311 |
| 2013/0276437 A1 * | 10/2013 | Iwasaki | ................... | F01N 3/025 60/303 |
| 2014/0110935 A1 * | 4/2014 | Shiizaki | ................ | F01N 13/082 285/332 |
| 2014/0144717 A1 | 5/2014 | Nakashima et al. | | |
| 2014/0151143 A1 | 6/2014 | Nakashima et al. | | |

FOREIGN PATENT DOCUMENTS

| | | | | |
|---|---|---|---|---|
| JP | 3-229907 | | 10/1991 | |
| JP | 2009-293542 A | | 12/2009 | |
| JP | 2013-19291 A | | 1/2013 | |
| JP | 2013-24077 A | | 2/2013 | |
| JP | 2013-24078 | | 2/2013 | |
| WO | WO 2012104894 A1 * | | 8/2012 | .............. F01N 3/025 |
| WO | WO 2013/011665 A1 | | 1/2013 | |
| WO | WO 2013/011666 A1 | | 1/2013 | |
| WO | WO 2013008548 A1 * | | 1/2013 | .............. F01N 13/08 |

OTHER PUBLICATIONS

Office Action issued Mar. 17, 2015 in Japanese Patent Application No. 2013-088524 (with partial English language translation).

* cited by examiner

EXHAUST APPARATUS OF CONSTRUCTION MACHINE

BACKGROUND OF THE INVENTION

1. Field of the Invention

The present invention relates to an exhaust apparatus for discharging an exhaust gas of an engine and air having provided cooling for an engine room, to an outside of the engine room, in a construction machine such as a hydraulic excavator equipped with the engine and the engine room.

2. Description of the Related Art

A background art of the present invention is described by taking a hydraulic excavator as an example.

A general hydraulic excavator includes a crawler-type lower crawling body, an upper slewing body slewably mounted around an axis perpendicular to a ground surface on the lower crawling body, and a working attachment attached to the upper slewing body. At a rear end part of the upper slewing body is provided an engine room, in which a plurality of devices such as an engine, a cooling fan, a muffler, and a heat exchanger are disposed.

This type of a hydraulic excavator may be provided with an apparatus for discharging exhaust gas from the engine and exhaust wind which is air having been sucked into the engine room by the cooling fan and having cooled the heat exchanger and the like, to an outside of the engine room; as such an apparatus, there have been known one disclosed in Japanese Patent Application Laid-Open No. H3-229907 or Japanese Patent Application Laid-Open No. 2013-024078. The apparatus described in each of the documents have a duct and an exhaust gas pipe. The duct is provided in the engine room and has a cylindrical shape opened at upper and lower opposite sides. The exhaust gas pipe has a tip end part inserted into the duct to mix the exhaust gas with the exhaust wind in the duct. This allows the exhaust gas whose temperature has been decreased to be discharged outward and enables the reduction in the noise generated by operation in the duct to be expected.

The insertion of the tip end part of the exhaust gas pipe into the duct, however, involves an increase in a required length of the exhaust gas pipe as compared with a case of piping the exhaust gas pipe to an outside of the engine room in a shortest distance independently of the duct. The increase in the pipe length basically involves increased vibration of the exhaust gas pipe.

In addition, the above exhaust gas pipe, being joined to a muffler connected to the engine, can be vibrated integrally with the engine as a part of an engine vibration system; therefore, when resonance occurs, it may make the vibration of the entire exhaust gas pipe be greater to thereby break the exhaust gas pipe. Problems in durability can be thus generated.

Besides, the increase in the required length of the exhaust gas pipe involves a difficulty of securing sufficient strength of the exhaust gas pipe.

SUMMARY OF THE INVENTION

An object of the present invention is to provide an exhaust apparatus which is provided in a construction machine equipped with an engine and an engine room which accommodates the engine, the exhaust apparatus comprising a duct and an exhaust gas pipe to discharge exhaust gas together with exhaust wind while allowing the vibration of the exhaust gas pipe to be suppressed and allowing a required strength of the exhaust gas pipe to be secured. The exhaust apparatus includes: a duct provided in the engine room; a fan adapted to suck air into the engine room to make the air cool the engine room and discharge through the duct the air having cooled the engine room to an outside as exhaust wind; and an exhaust gas pipe adapted to guide exhaust gas of the engine into the duct. The exhaust gas pipe has a duct inner portion located inside the duct and a duct outer portion connected to the duct inner portion and located outside the duct. The duct inner portion has a plurality of discharge holes which allow the exhaust gas to be injected into the duct through the discharge holes and to be discharged to the outside together with the exhaust wind. Furthermore, the duct inner portion is connected to the duct separately from the duct outer portion.

DESCRIPTION OF THE PREFERRED EMBODIMENT

An embodiment of the present invention is described with reference to FIG. 1 to FIG. 5.

Figure 1:
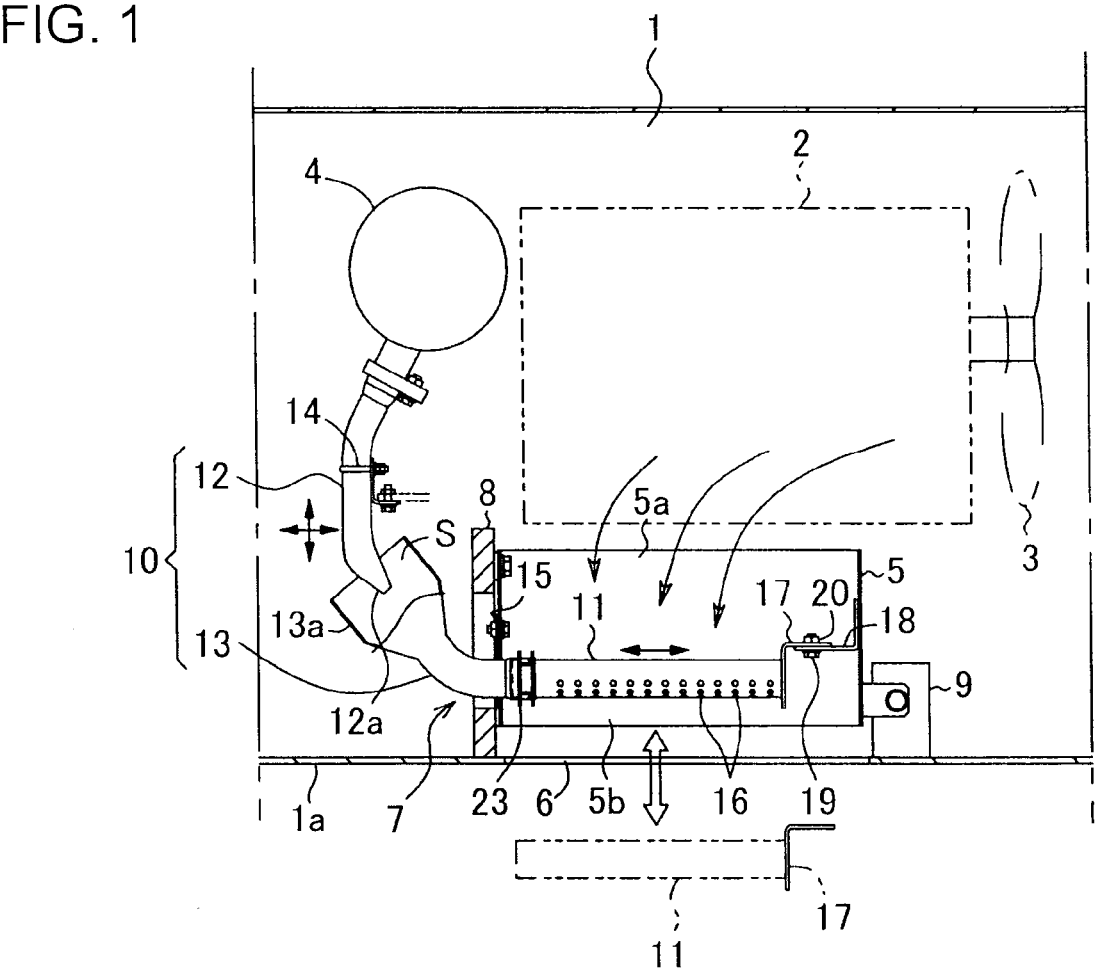
FIG. 1 is a partially cross-sectional rear view showing an exhaust apparatus according to an embodiment of the present invention.

The present embodiment is an example of an application of the present invention to a hydraulic excavator. The hydraulic excavator, as shown in FIG. 1, includes an engine room 1 formed in a rear end region of an upper slewing body. The engine room 1 accommodates an engine 2, a cooling fan 3, a muffler 4, a cylindrical duct 5, and other devices such as a heat exchanger not shown, for example. The cooling fan 3 is adapted to rotate to suck air into the engine room 1 and make the air provide cooling for the engine room 1, specifically for the heat exchanger and the like, and discharge through the duct 5 the air having provided the cooling, as exhaust wind, to an outside through an exhaust port 6.

The hydraulic excavator further includes an exhaust gas pipe 7 that is connected to the muffler 4. The exhaust gas pipe 7 has a tip end part to be inserted into the duct 5 to mix the exhaust gas from the engine 2 with the exhaust wind in the duct 5 and discharge it to an outside.

In the following, "right and left" regarding the duct 5 and the exhaust gas pipe 7 coincides with "right and left" in FIG. 1.

The hydraulic excavator has a bottom wall 1a of the engine room 1, and the bottom wall 1a is formed with the exhaust port 6. The duct 5 has an upper end surrounding an introduction port 5a and a lower end surrounding an exhaust wind port 5b. The duct 5 is located above the exhaust port 6 and below the engine 2. The duct 5 is disposed so as to guide the exhaust wind downward, that is, from above to below, and discharge the exhaust wind from the exhaust port 6, specifically, disposed so as to make the exhaust wind port 5b face the exhaust port 6. On the bottom wall 1a, duct fitting members 8 and 9 are installed upright, allowing left and right side parts of the duct 5 to be mounted to respective duct fitting members 8 and 9.

The exhaust gas pipe 7 has a duct outer portion 10 located outside the duct 5 and a duct inner portion 11 located inside the duct 5. The portions 10 and 11 are connected to each other.

The duct outer portion 10 is divided into a first portion 12 and a second portion 13. The first portion 12 has a base end part detachably connected to the muffler 4. The second portion 13 has a tip end part detachably connected to the duct inner portion 11 and a base end part 13a connected to the first portion 12. The base end part 13a has a funnel shape with a larger diameter than that of the first portion 12. The first portion 12 has a tip end part to be inserted into the base end part 13a with a radial space S as shown in FIG. 1. This insertion brings the first and second portions 12 and 13 into detachable connection to each other. The first and second portions 12 and 13 are connected to each other so as to be movable relatively to each other in a length direction and in a diameter direction within the space S, that is, so as to allow their relative positions to be adjusted in up-and-down and right-and-left directions.

The base end part 13a of the second portion 13 according to the present embodiment is inclined to the left as shown in FIG. 1. This inclination enables relative positions of the first and second portions 12 and 13 to be simultaneously adjusted both in a length direction and in a diameter direction.

The radial space S can be suitably set. Preferably, the space S has a size larger than a maximum vibration range of either of the first and second portions 12 and 13. Even when the first portion 12 of the engine vibration system resonates, the space S having this size can prevent the resonance from being transmitted from the first portion 12 to the second portion 13.

The tip end part of the first portion 12 forms a taper nozzle portion 12a, which is loosely inserted into the base end part 13a of the second portion 13.

Figure 2:
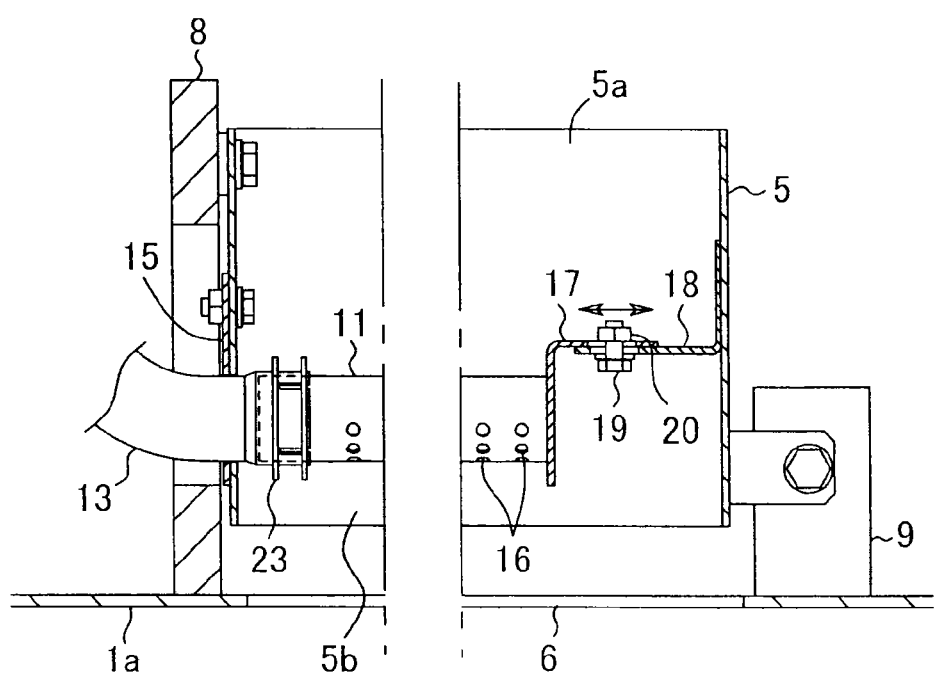
FIG. 2 is a partially enlarged view of FIG. 1.
Figure 3:
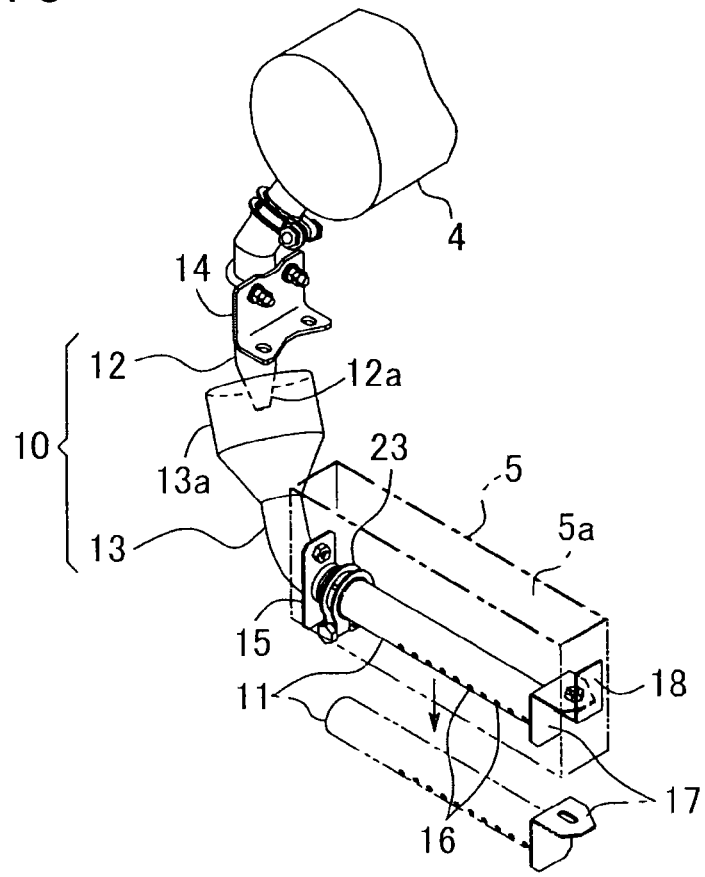
FIG. 3 is a perspective view of the exhaust apparatus.
Figure 4:
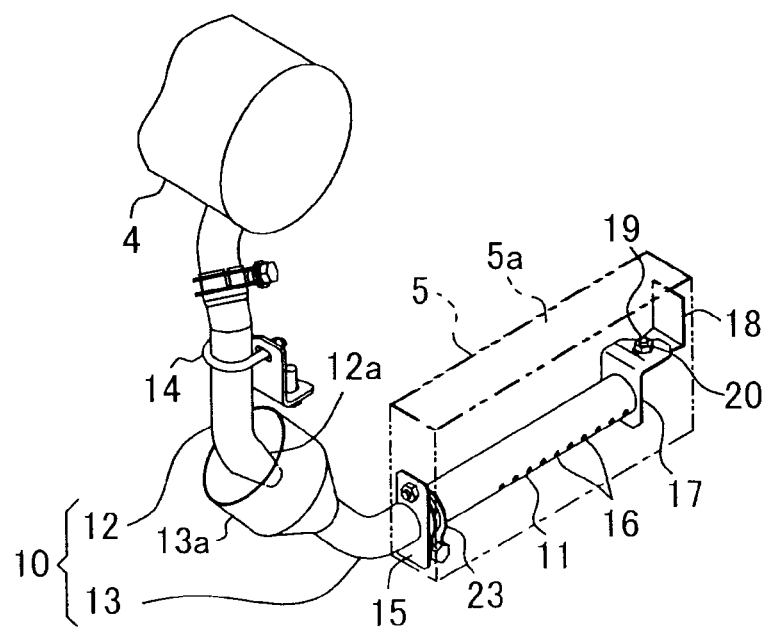
FIG. 4 is a perspective view of the exhaust apparatus viewed from a direction different from that of FIG. 3.

The duct outer portion 10 is mounted to a fixed-side portion in the engine room 1. Specifically, as shown in FIG. 1, the first portion 12 is connected to the fixed-side portion via a clamp member 14. As shown in FIG. 2, the tip end part of the second portion 13 penetrates through a left side wall of the duct 5 to be introduced into the duct 5 by piercing. The introduced portion is supported by a support plate 15 mounted to the left side wall.

The duct inner portion 11 extends in the duct 5 in a direction intersecting with a flow direction of the exhaust wind flows, preferably, in a right-and-left direction substantially orthogonal to the flow direction of the exhaust wind, as shown in FIG. 1 and FIG. 2. "right-and-left direction substantially orthogonal" includes not only a direction completely orthogonal but also a direction inclined left downward or right downward.

The duct inner portion 11 has a plurality of discharge holes 16. The discharge holes 16 are spaced in a peripheral direction and a length direction of the duct inner portion 11 at a lower half peripheral portion over substantially a total length of the duct inner portion 11. The exhaust gas is injected into the duct 5 through each of the discharge holes 16 and discharged to an outside together with the exhaust wind.

The duct inner portion 11 has a base end part and a tip end part. In the present embodiment, the base end part of the duct inner portion 11 is a left side end part and the tip end part is a right side end part. The base end part and the tip end part are mounted to the duct 5. The structure therefor is as follows.

Figure 5:
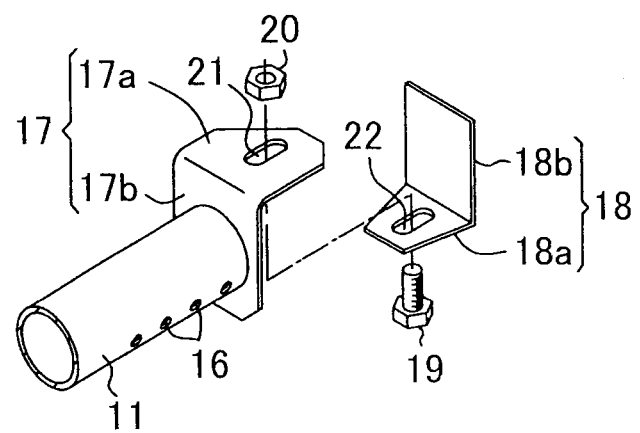
FIG. 5 is a partially enlarged exploded perspective view showing a structure for connecting a tip end part of an exhaust gas pipe to a duct in the exhaust apparatus.

For mounting the tip end part, used are a pipe-side bracket 17 and a duct-side bracket 18 as shown in FIG. 5. The pipe-side bracket 17 is connected to a tip end of the duct inner portion 11. The duct-side bracket 18 is fixed to an inner surface of a right side wall of the duct 5. The pipe-side bracket 17 and the duct-side bracket 18 are detachably fastened to each other by a bolt 19 that is inserted into both the brackets 17 and 18 from below and a nut 20 screwed with the bolt 19, in a state that the pipe-side bracket 17 is located at an upper side of the duct-side bracket 18 so as to allow the weight of the duct inner portion 11 to be supported by the duct 5 via the duct-side bracket 18.

Specifically, the pipe-side bracket 17 includes a horizontal portion 17a and a vertical portion 17b which are integrally formed and intersect with each other. The duct-side bracket 18 includes a horizontal portion 18a and a vertical portion 18b which are integrally formed and intersect with each other. In other words, each of the brackets 17 and 18 is formed of a plate bent in L-shape. The vertical portions 17b and 18b are fixed to the tip end of the duct inner portion 11 and a right side wall inner surface of the duct 5 by welding, respectively. The horizontal portions 17a and 18a are fastened to each other by the bolt 19 and the nut 20 as described above. The vertical portion 17b of the pipe-side bracket 17 is mounted to the duct inner portion 11 so as to block an opening at a tip end of the duct inner portion 11.

As shown in FIG. 5, the horizontal portions 17a and 18a of the brackets 17 and 18 have respective bolt holes 21 and 22 extending in a right-and-left direction, through which the bolt 19 is inserted. Within a range of lengths of the bolt holes 21 and 22, relative positions of the brackets 17 and 18 can be adjusted in a length direction of the duct inner portion 11, i.e., a right-and-left direction. This allows a position at which the right side end of the duct inner portion 11 is mounted to be adjusted to a right-and-left direction. The relative positions can be also adjusted also when only one of the bolt holes 21 and 22 is a long hole. Besides, in the case where at least one of the bolt holes 21 and 22 is a circle having a larger diameter than that of the diameter of the bolt 19, the relative positions are allowed to be adjusted also in a front-and-rear direction.

On the other hand, mounting the base end part of the duct inner portion 11, the left side end part in the present embodiment, is performed by use of a clip 23. The clip 23 detachably interconnects the base end part of the duct inner portion 11 and the tip end part of the second portion 13 of the duct outer portion 10, in a state that the base end part of the duct inner portion 11 is inserted into the tip end part of the second portion 13 of the duct outer portion 10 in the duct 5. The base end part of the duct inner portion 11 is thus mounted to the duct 5 via the second portion 13 and the support plate 15, that is, supported by the duct 5.

In the exhaust apparatus described above, the exhaust gas pipe 7 includes the duct outer portion 10 included in the engine vibration system and the duct inner portion 11 included in a body vibration system, the portions 10 and 11 are separately fixed; this enables the vibration of the exhaust gas pipe 7 to be suppressed. Furthermore, fixing the duct inner portion 11 to the duct 5 makes it possible to avoid resonance of the entire exhaust gas pipe 7. Thus, the exhaust gas pipe 7 can be prevented from breakage due to the vibration, and durability can be improved.

Besides, in the exhaust apparatus, fixing the duct inner portion 11 of the exhaust gas pipe 7 to the duct 5 allows strength of the duct inner portion 11 and, by extension, strength of the entire exhaust gas pipe 7 to be enhanced. In addition, mounting the right and left end parts of the duct inner portion 11 to the duct 5 allows the vibration suppression effect and the strength improvement effect to be more increased.

According to the exhaust apparatus, where the front end part of the duct inner portion 11 is detachably connected to the duct outer portion 10, specifically, to the second portion 13, in the duct 5, while the front end part thereof is detachably mounted to the duct 5 by the pipe-side bracket 17 and the duct-side bracket 18 in the duct 5, the connection and separation of the duct inner portion 11 with respect to the duct outer portion 10 and the attachment and detachment of the duct inner portion 11 with respect to the duct 5 can be performed in the duct 5. This enables detachment of the duct inner portion 11 for maintenance and the like to be easily performed by utilization of a lower end opening of the duct 5 and the exhaust port 6, as shown by a two-dot chain line in FIG. 1 and FIG. 3.

In the exhaust apparatus, the bolt detachment operation can be performed in a state where the duct 5 supports the weight of the duct inner portion 11, which makes it possible to easily detach the bolt in the duct 5 with small labor.

In the exhaust apparatus, the pipe-side bracket 17 includes the horizontal portion 17a and the vertical portion 17b, which is mounted to the duct inner portion 11 so as to block the opening of the tip end of the duct inner portion 11; this allows an injection volume of the exhaust gas from the discharge holes 16 to be increased, thus enhancing the diffusion of the exhaust gas. In addition, utilizing the pipe-side bracket 17 also as a member for blocking the opening of the tip end makes it possible to reduce cost and facilitate an assembling work.

In the exhaust apparatus, the duct outer portion 10 of the exhaust gas pipe 7 is divided into the first portion 12 connected to the muffler 4 and the second portion 13 connected to the duct inner portion 11 in the length direction, which enables the vibration to be more suppressed.

In the exhaust apparatus, the first portion 12 and the second portion 13 are connected to each other in a state that the front end part of the first portion 12 is loosely inserted into the base end part of the second portion 13 with the radial space S, which allows the relative positions of the portions 12 and 13 to be adjusted in a length direction to adjust the length of the duct outer portion 10 itself, and to be adjusted also in a diameter direction. This allows the relative positions of the muffler 4 and the duct outer portion 10 and the relative positions of the duct outer portion 10 and the duct inner portion 11 to be easily adjusted, the adjustment can accommodate manufacturing errors and assembling errors of the duct outer portion 10, the duct inner portion 11, the muffler 4, and the duct 5. Besides, even when, for example, the first portion 12 of the engine vibration system resonates, the space S can prevent the vibration due to the resonance from being transmitted to the second portion 13.

In the exhaust apparatus, the tip end part of the first portion 12 forms the taper nozzle portion 12a, which can increase a flow rate of the exhaust gas to thus prevent the exhaust gas from adverse flow and from leakage in each connection area due to the adverse flow.

The present invention is not limited to the embodiment described above but can include, for example, the following aspects.

(1) Although, in the above embodiment, the base end part of the duct inner portion 11 is indirectly mounted to the duct 5 via a connection portion with the second portion 13 of the duct outer portion 10 and via the support plate 15, the duct inner portion according to the present invention may be independently mounted to the duct 5 separately from the connection portion.

(2) The tip end part of the duct inner portion 11, if not required to have a position adjustment function, may be directly mounted to the duct 5 by a bracket or the like.

(3) Although, in the above embodiment, the first portion 12 is inserted into the funnel-shaped base end part of the second portion 13 of the duct outer portion 10 with the space, the tip end part of the first portion, if not required to have a nozzle function, may be spread in a funnel shape, conversely, to allow the base end part of the second portion 13 to be inserted into the spread funnel-shaped front end part with a space.

(4) In the case of no requirement for a position adjustment function of the duct outer portion 10, the entire duct outer portion 10 is permitted to be a single member.

(5) The present invention can be also applied to a construction machine other than a hydraulic excavator. The present invention can be widely used, in a construction machine equipped with an engine and an engine room accommodating the engine, to discharge the air having provided cooling and the exhaust gas together from the engine room to an outside.

As described above, according to the present invention, there is provided an exhaust apparatus which is provided in a construction machine equipped with an engine and an engine room which accommodates the engine, the exhaust apparatus comprising a duct and an exhaust gas pipe to discharge exhaust gas together with exhaust wind while allowing the vibration of the exhaust gas pipe to be suppressed and allowing a required strength of the exhaust gas pipe to be secured. The exhaust apparatus includes: a duct provided in the engine room; a fan adapted to suck air into the engine room to make the air cool the engine room and discharge through the duct the air having cooled the engine room to an outside as exhaust wind; and an exhaust gas pipe adapted to guide exhaust gas of the engine into the duct. The exhaust gas pipe has a duct inner portion located inside the duct and a duct outer portion connected to the duct inner portion and located outside the duct. The duct inner portion has a plurality of discharge holes which allow the exhaust gas to be injected into the duct through the discharge holes and to be discharged to the outside together with the exhaust wind. Furthermore, the duct inner portion is connected to the duct separately from the duct outer portion.

According to the exhaust apparatus, the separate fixations of the duct outer portion included in the engine vibration system and the duct inner portion included in the body vibration system basically enables the vibration of the exhaust gas pipe to be suppressed. In addition, fixing the duct inner portion to the duct allows the resonance of the entire exhaust gas pipe to be avoided. Thus, the exhaust gas pipe can be prevented from breakage due to the vibration thereof to improve its durability. Besides, the fixation of the duct inner portion of the exhaust gas pipe allows the strength of the duct inner portion itself and, by extension, the strength of the entire exhaust gas pipe to be enhanced.

It is preferable that the duct inner portion of the exhaust gas pipe extends in the duct in a direction intersecting with an exhaust wind direction, more preferably in an orthogonal direction to the exhaust wind direction and both end parts of the duct inner portion are mounted to the duct. Thus fixing the duct inner portion to the duct at both end parts thereof allows the vibration suppression and the strength improvement to be more enhanced.

Preferably, the duct inner portion of the exhaust gas pipe is detachably connected to the duct outer portion in the duct and is also detachably mounted to the duct. Thus allowing the detachment of the duct inner portion to the duct outer portion and the duct to be performed in the duct makes it possible to easily perform the attachment and detachment of the duct inner portion for maintenance and the like by utilization of the exhaust wind port of the duct.

In the present invention, it is preferable that: the duct is provided so as to locate an exhaust wind port of the duct at a lower side and guide exhaust wind from above to below; the exhaust apparatus further includes a pipe-side bracket provided at a tip end of the duct inner portion of the exhaust gas pipe and a duct-side bracket provided in the duct; and the pipe-side and both-side brackets are fastened to each other in a state that the pipe-side bracket is located on the duct-side bracket so as to allow the duct-side bracket to support the duct inner portion at an lower side of the duct inner portion. Thus allowing the brackets to be fastened to each other in a state that the duct supports the weight of the duct inner portion makes it possible to easily perform the attachment and detachment in the duct with small labor.

In this case, the pipe-side bracket and the duct-side bracket are preferably fastened to each other so as to allow relative positions of the pipe-side bracket and the duct-side bracket to be adjusted in a length direction of the duct inner portion, that is, a direction in which the exhaust wind is guided. The adjustment of the relative positions allows the position of the duct inner portion relative to the duct outer portion to be adjusted in a length direction, thereby accommodating assembling errors and manufacturing errors of each part.

It is preferable that: the pipe-side bracket includes a horizontal portion extending horizontally and a vertical portion extending vertically; the vertical portion is mounted to a tip end of the duct inner portion so as to block an opening of the tip end of the duct inner portion; and the horizontal portion is fastened to the duct-side bracket at an upper side of the duct-side bracket. The vertical portion of the pipe-side bracket, thus blocking the opening of the tip end of the duct inner portion, can increase the injection volume of the exhaust gas from the discharge holes, thereby increasing the diffusion of the exhaust gas in the duct. Besides, utilizing the pipe-side bracket also as a member for blocking the opening of the tip end of the duct inner portion makes it possible to reduce cost and facilitate the assembling work.

In the case where the exhaust apparatus according to the present invention further includes a muffler, it is preferable that the duct outer portion of the exhaust gas pipe is divided in a length direction thereof into a first portion to be connected to the muffler and a second portion to be connected to the duct inner portion, and an end part of one of the first and second portions is inserted into an end part of the other with a radial space to thus connect the first and second portions to each other. Thus further dividing the duct outer portion enables the vibration to be further suppressed. Besides, the space allows relative positions of the first and second portions to be adjusted in a length direction, that is, allows a length of the duct outer portion to be adjusted, and further adjust in a diameter direction in the space. Thus, the relative positions of the muffler and the duct outer portion and the relative positions of the duct outer portion and the duct inner portion can be easily adjusted, and the adjustment can accommodate manufacturing errors and assembling errors of the duct outer portion, the duct inner portion, the muffler, and the duct. Furthermore, even when, for example, the first portion of the engine oscillation system resonates, it is possible to prevent the vibration due to the resonance from being transmitted to the second portion, by making the radial size of the space larger than a maximum magnitude of the vibration due to that of both the first and second portions.

It is preferable that the tip end part of the first portion of the duct outer portion forms a taper nozzle part, which is inserted into the base end part of the second portion with the space to connect the first and second portions to each other. The nozzle part can increase a flow rate of the exhaust gas to thereby prevent the exhaust gas from adverse flow and leakage at a connection spot due to the adverse flow.

This application is based on Japanese Patent application No. 2013-088524 filed in Japan Patent Office on Apr. 19, 2013, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. An exhaust apparatus for use in a construction machine including an engine and an engine room which accommodates the engine, and has an exhaust port for exhausting exhaust wind to an outside of the engine room, the exhaust wind being a mixture flow of a flow of air having cooled the engine room and a flow of exhaust gas having been exhausted from the engine, the exhaust apparatus comprising:
a duct provided in the engine room, and having an introduction port for introducing the flow of air having cooled the engine room into an inside of the duct and an exhaust wind port for exhausting the exhaust wind, the exhaust wind port facing the exhaust port;
a fan adapted to suck air into the engine room to generate a primary air current for permitting the flow of air to go into the inside of the duct after cooling the engine room, and permitting the exhaust wind to go through the exhaust wind port of the duct and the exhaust wind port of the engine room to the outside of the engine room;
an exhaust gas pipe adapted to guide the exhaust gas from the engine into the duct,
the exhaust gas pipe including:
a duct outer portion located outside the duct and having two opposite ends, one of the two opposite ends being located in the inside of the duct, the duct outer portion being held by the duct;
a duct inner portion located in the inside of the duct and having two opposite ends; and
a plurality of discharge holes adapted to inject the exhaust gas into the inside of the duct where the flow of exhaust gas and the flow of air are mixed with each other to produce the exhaust wind;
a first connector adapted to detachably connect one end of the duct inner portion to the duct; and
a second connector adapted to detachably connect the other end of the duct inner portion to the one end of the duct outer portion.

2. The exhaust apparatus according to claim 1, wherein the duct inner portion extends in the inside of the duct in a direction intersecting with a direction of the primary air current in the duct.

3. The exhaust apparatus according to claim 1, wherein:
the exhaust wind port of the duct is disposed at a lower side of the engine room so that the exhaust wind flows downward;
the first connector comprises a pipe-side bracket provided at one side end of the duct inner portion and a duct-side bracket provided on the duct,
the pipe-side bracket and the duct-side bracket being detachably fastened to each other in a state that the pipe-side bracket rides on the duct-side bracket.

4. The exhaust apparatus according to claim 3, wherein the first connector further includes a length adjuster to allow a relative position between the pipe-side bracket and the duct-side bracket to be adjusted in a length direction of the duct inner portion.

5. The exhaust apparatus according to claim 3, wherein:
the duct inner portion has an opening on the one end thereof;

the pipe-side bracket includes a horizontal portion horizontally extending and a vertical portion vertically extending;

the vertical portion is mounted to the one end of the duct inner portion so as to block the opening of the duct inner portion; and the horizontal portion is detachably fastened to the duct-side bracket.

6. The exhaust apparatus according to claim 1, further comprising a muffler, wherein:

the duct outer portion has a first portion connected to the muffler and a second portion connected to the duct inner portion, the first portion and the second portion being separated from each other; and the first portion and second portion having adjoining end parts, respectively, one end joining end part lying in a space of the other joining end part.

7. The exhaust apparatus according to claim 6, wherein the joining end part of the first portion has a shape of a taper nozzle, which lies in the space of the joining end part of the second portion.

8. The exhaust apparatus according to claim 1, wherein the second connector includes a clip which detachably interconnects the other end of the duct inner portion and the one end of the duct outer portion.

9. The exhaust apparatus according to claim 1, wherein the duct includes a support plate which supports the one end of the duct outer portion.

\* \* \* \* \*